Aug. 15, 1944.  E. P. BULLARD, 3D., ET AL  2,355,624
TRANSMISSION
Filed Nov. 25, 1939
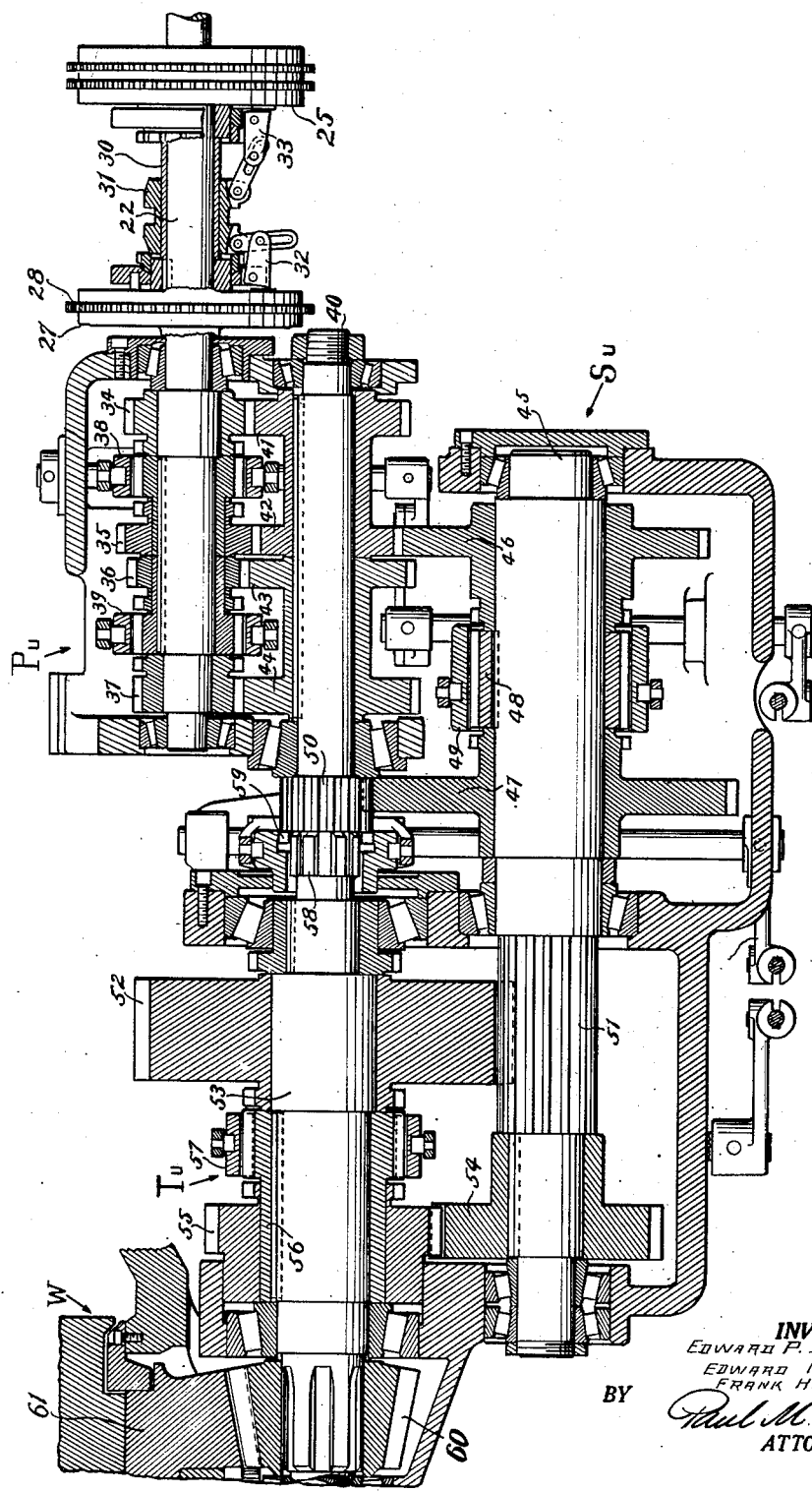
INVENTORS
EDWARD P. BULLARD III
EDWARD N. COWELL
FRANK H. MUSSLER
BY Paul M. Geist
ATTORNEY.

Patented Aug. 15, 1944

2,355,624

UNITED STATES PATENT OFFICE 2,355,624

TRANSMISSION

Edward P. Bullard, III, Fairfield, and Edward N. Cowell and Frank H. Mussler, Stratford, Conn., assignors to The Bullard Company, a corporation of Connecticut Application November 25, 1939, Serial No. 306,122

12 Claims. (Cl. 74—359)

This invention relates to transmissions generally, and particularly to a heavy duty transmission for rotating a member of a machine tool.

Objects of this invention include the provision of a transmission having gears constantly in mesh, and in which various gear combinations may be established to provide different operating trains for driving a driven member at various speeds; the provision of such a transmission in which any desired gear combination may be established without passing through any intermediate gear combination; the provision of such a transmission in which a minimum number of gears is employed to produce a given number of different speeds for the driven member; the provision of such a transmission in which only parallel shafts are employed between the driving and driven shafts; and the provision of such a transmission in which the different gear combinations may be selectively engaged to produce speeds which vary substantially in accordance with a geometrical progression.

The above, as well as other objects and novel features of the invention will become apparent upon a consideration of the following specification and the accompanying drawing in which:

The figure is a sectional elevational view of a transmission embodying the principles of the present invention.

The subject matter of this application is related to application Serial No. 345,772, filed July 16, 1940, in the names of Edward P. Bullard, III, et al., and application Serial No. 379,022, filed February 15, 1941, in the names of Edward P. Bullard, III, et al.

Referring to the drawing, the transmission comprises a driving shaft 22 that is driven from a prime mover through a multiple V pulley (not shown). The driving shaft 22 supports a multiple-disc friction clutch 25. A friction brake 27 is likewise supported on the drive shaft 22, and comprises a friction disc 28 having peripheral teeth adapted to mesh with internal teeth disposed about an opening in a fixed bracket (not shown). Both the clutch 25 and the brake 27 are provided with metal discs splined to the drive shaft 22 on each side of the friction discs. A sleeve 30 surrounds the shaft 22 between the clutch 25 and the brake 27, and supports a slidable grooved spool 31. Toggle connections 32, 33 are provided between the spool 31 and certain of the movable metal discs of the clutch 25 and brake 27 whereupon axial movement of spool 31 alternately engages and releases the clutch 25 and brake 27.

The transmission is adapted to drive a driven member W at different predetermined speeds throughout a given range. In the present embodiment of the invention it is desirable that the different specific speeds at which the driven member W is adapted to be driven shall vary substantially in accordance with a geometrical progression. Furthermore, it is desirable to employ as few gears as possible within the transmission.

The above desirable features have been attained by employing a primary unit $P_u$, a secondary unit $S_u$ and a tertiary unit $T_u$. These units are designed and constructed so that only parallel shafts are employed throughout the transmission, and certain gears are common to various units. Additionally, the gear combinations of the various units are designed so that the different speeds of the transmission will increase substantially in accordance with a geometrical progression. When it is desired to cover a specific range of speeds with a given number of changes of speed, it is first necessary to determine the geometrical constant for the desired speed range. This is determined by multiplying the lowest desired speed by the geometrical constant raised to a power equal to the number of desired changes of speed minus 1 and letting that product equal the maximum speed desired from which equation the geometrical constant may be obtained.

The gear combinations of the various units are designed so that the ratio of any gear combination in the primary unit divided by the ratio of a gear combination therein which produces the next lower speed in said primary unit is equal to the first power of the geometrical constant; the ratio of any gear combination in the secondary unit divided by the ratio of a gear combination therein which produces the next lower speed in said secondary unit is equal to the fourth power of the geometrical constant; and the ratio of any gear combination in the tertiary unit divided by the ratio of a gear combination therein which produces the next lower speed in said tertiary unit is equal to the eighth power of the geometrical constant.

Four spur gears 34, 35, 36, 37 are freely journaled on the drive shaft 22, and each gear is provided with positive-action clutch engaging teeth arranged between gears 34, 35, and 36, 37. Slidable gear-engaging means 38 and 39 are keyed to the driving shaft 22 and are located between respective gear sets 34, 35, and 36, 37. Thus, movement of the engaging means 38, 39 to the left or to the right will respectively connect to shaft 22 either gears 35, 37 or gears 34, 36. A shaft 40 parallel to shaft 22 is provided in the transmission and is adapted to support four gears 41, 42, 43 and 44 arranged in units of two. These last-mentioned gears are keyed to the shaft 40 and each is retained in constant mesh with gears 34, 35, 36 and 37 respectively. The gears 34, 35, 36 and 37 and 41, 42, 43 and 44, comprise the primary unit P_u of the transmission.

An additional parallel shaft 45 is provided in the transmission on which gears 46 and 47 are freely journaled. The gears 46 and 47 are likewise provided with positive-action clutch-engaging teeth on adjacent sides. A positive-action gear-engaging means 48 is keyed to the shaft 45 and is provided with a slidable element 49 for selectively engaging the gears 46 and 47. The gear 46 on shaft 45 is adapted to be maintained in constant mesh with the gear 42 on shaft 40, while the gear 47 on shaft 45 is adapted to be maintained in constant mesh with an additional gear 50 integral with the shaft 40. Gears 46, 42, 47 and 50 comprise the secondary unit S_u. The shaft 40 acts as a common shaft between the primary and secondary units, and gear 42 serves a dual function in meshing with gear 35 of the primary unit and gear 46 of the secondary unit. By selectively shifting the means 38 and 39, shaft 40 can be driven at four separate and distinct speeds from the drive shaft 22. Furthermore, the shaft 45 may be driven at eight separate and distinct speeds from the drive shaft 22 by selectively shifting the means 38, 39 and 49.

The shaft 45 of the secondary unit is extended and forms one shaft of the tertiary unit T_u. The extended portion of shaft 45 is provided with gear teeth 51 adapted to be maintained in constant mesh with a gear 52 freely journaled on a driven shaft 53 forming the other shaft of the tertiary unit T_u. Likewise, the extended portion of shaft 45 fixedly supports a gear 54 adapted to be maintained in contant mesh with a gear 55 freely journaled on a sleeve 56, which latter is keyed to the driven shaft 53. Each of the gears 52 and 55 are provided with positive-action engaging-means facing each other and disposed between the two gears. A shiftable engaging means 57 splined to sleeve 56 is provided between the last two gears for selectively engaging either. Inasmuch as the shaft 45 may be driven at eight different speeds from the driving shaft 22, it follows that selectively shifting the means 57 of the tertiary unit T_u will impart sixteen separate and distinct speeds of rotation to the driven shaft 53.

The driven shaft 53 is arranged coaxially with the shaft 40. This arrangement makes it possible to produce an additional four speeds of rotation of the driven shaft 53 from the driving shaft 22 by employing a single additional gear. Accordingly, the gear 50, fixed to shaft 40, is made longer than would be necessary for its proper meshing with gear 47. The end of driven shaft 53 adjacent the gear 50 is provided with a spline 58. An internal ring gear 59 is splined on the end of driven shaft 53 and is adapted selectively to be moved axially to directly connect driven shaft 53 with shaft 40.

From an inspection of the drawing, it is apparent that the driven shaft 53 may be driven at 20 different speeds while employing gears that remain constantly in mesh with their mating gears, thereby avoiding the difficulties common with constructions employing diving keys. Furthermore, the use of a common shaft between the secondary and primary units as well as common gears between units, together with the arrangement of the driven shaft 53 coaxial with shaft 40 of the primary and secondary units, tends to reduce to a minimum the number of gears in the transmission for a given number of different speeds of the driven member. Additionally, each gear combination in the primary, secondary and tertiary units is so designed that it may be used with any other gear combination in any other unit and the ability to employ the various gear combinations of each unit over and over further minimizes the number of gear combinations required for a given number of specific speeds of the driven shaft 53.

The driven shaft 53 is provided with a bevel gear 60 at its end opposite that which contains spline 58. This bevel gear 60 meshes with a bevel ring-gear 61 fixed to the under surface of the driven member W.

Although the various features of the improved transmission have been shown and described in detail to fully disclose one embodiment of this invention, it will be evident that numerous changes may be made in such details, and certain features may be used without others, without departing from the principles of the invention.

What is claimed is:

1. A transmission having less gears than the number of speeds at which said transmission is capable of driving a driven member comprising in combination, a driving shaft change-speed gearing on said driving shaft including a plurality of gears adapted to mesh with a like number of gears on a secondary shaft; a tertiary shaft having a plurality of gears mounted thereon and adapted to mesh with a like number of gears mounted on said secondary shaft, one of said gears on said tertiary shaft being adapted to mesh with a gear on the secondary shaft which latter is adapted to mesh with a gear on said driving shaft; another gear on said tertiary shaft adapted to mesh only with a gear on said secondary shaft; additional gears on said tertiary shaft adapted to mesh with a like number of gears on a driven shaft, all of said shafts being located along three parallel axes; and means for selectively combining any of said intermeshing gears with any of the other intermeshing gears on other shafts to drive said driven member.

2. A transmission having less gears than the number of different speeds at which said transmission is capable of driving a driven member comprising in combination, a driving shaft; change-speed gearing on said driving shaft including a plurality of gears journaled thereon, in constant mesh with a like number of gears keyed to a secondary shaft; a tertiary shaft having a plurality of gears journaled thereon, and in constant mesh with a like number of gears fixed to said secondary shaft, one of said gears on said tertiary shaft being in mesh with a gear on the secondary shaft which latter meshes with a gear on said driving shaft; another gear on said tertiary shaft in constant mesh only with a gear on said secondary shaft; additional gears fixed to said tertiary shaft in constant mesh with a like number of gears journaled on a driven shaft, all of said shafts being located along three parallel axes; and positive-action clutches on said driving, tertiary and driven shafts for selectively engaging certain of said gears, any of said intermeshing gears being adapted to be combined with any other of said intermeshing gears on other shafts to drive said driven member.

3. A transmission for driving a driven member at different speeds throughout a given range comprising a primary unit, a secondary unit, and a tertiary unit; each of said units comprising change-speed gearing including a plurality of gear combinations, any of which may be combined with any other in the other units, one gear combination in two of said units having a common gear, and at least one gear combination being provided between the shafts only of said secondary unit.

4. A transmission as claimed in claim 3, in which all of the gears of each of said units are in constant mesh with their mating gears; and positive-action clutches in each of said units for selectively engaging said gear combinations.

5. A transmission comprising in combination, a primary unit, a secondary unit and a tertiary unit, each of said units comprising change-speed gearing including a plurality of gear combinations; a common shaft for supporting gears of said primary and secondary units including a common gear adapted to mesh with a gear in said primary and secondary units; said secondary unit including at least one gear combination between its shafts only; said tertiary unit including a driven shaft coaxial with said common shaft; and means for selectively engaging and disengaging said common and driven shafts.

6. A transmission as claimed in claim 3, in which the ratio of any gear combination in the primary, secondary, and tertiary units divided by the ratio of a gear combination in said respective units for producing the next lower speed in said respective units is respectively equal to the first, fourth, and eighth powers of the geometrical constant for said speed range.

7. A transmission as claimed in claim 5, in which the ratio of any gear combination in the primary, secondary, and tertiary units divided by the ratio of a gear combination in said respective units for producing the next lower speed in said respective units is respectively equal to the first, fourth, and eighth powers of the geometrical constant for said speed range.

8. A transmission having less gears than the number of different speeds at which said transmission is capable of driving a driven member comprising in combination, a driving shaft; change-speed gearing on said driving shaft including a plurality of gears adapted to mesh with a like number of gears on a secondary shaft; a tertiary shaft having a plurality of gears mounted thereon and adapted to mesh with a like number of gears mounted on said secondary shaft, one of said gears on said tertiary shaft being adapted to mesh with a gear on the secondary shaft which latter is adapted to mesh with a gear on said driving shaft; another gear on said tertiary shaft adapted to mesh only with a gear on said secondary shaft; a driven shaft co-axial with said secondary shaft; additional gears on said tertiary shaft adapted to mesh with a like number of gears on said driven shaft; and means for selectively combining any of said intermeshing gears with any of the other intermeshing gears on other shafts and for coupling said driven shaft to said secondary shaft to drive said driven member.

9. A transmission having less gears than the number of different speeds at which said transmission is capable of driving a driven member comprising in combination, a driving shaft; change-speed gearing on said driving shaft including a plurality of gears journaled thereon, in constant mesh with a like number of gears keyed to a secondary shaft; a tertiary shaft having a plurality of gears journaled thereon, and in constant mesh with a like number of gears fixed to said secondary shaft, one of said gears on said tertiary shaft being in mesh with a gear on the secondary shaft which latter meshes with a gear on said driving shaft; another gear on said tertiary shaft in constant mesh only with a gear on said secondary shaft; a driven shaft coaxial with said secondary shaft; additional gears fixed to said tertiary shaft in constant mesh with a like number of gears journaled on said driven shaft; and positive-action clutches on said driving, tertiary and driven shafts for selectively engaging certain of said gears and for engaging and disengaging said driven shaft with said secondary shaft, any of said intermeshing gears being adapted to be combined with any other of said intermeshing gears on other shafts to drive said driven member.

10. In a transmission, a driving shaft; an auxiliary shaft; a third shaft; a driven shaft, coaxial with said auxiliary shaft; a plurality of separate change-speed gearing combinations between said driving and auxiliary shafts; a change-speed gearing combination between said third and auxiliary shafts; a change-speed gearing combination between said third and driven shafts and means for connecting said driven shaft to said auxiliary shaft.

11. In a transmission, a driving shaft; an auxiliary shaft; a third shaft; a driven shaft, co-axial with said auxiliary shaft; a change-speed gearing combination between said driving and auxiliary shafts; a change-speed gearing combination between said third and auxiliary shafts; one of the gears on said auxiliary shaft being adapted to mesh with a gear on said driving and third shafts and another gear on said auxiliary shaft being adapted only to mesh with a gear on said third shaft; a change-speed gearing combination between said third and driven shafts; and means for connecting and disconnecting said auxiliary and driven shafts.

12. In a transmission, a driving shaft; an auxiliary shaft; a third shaft; a driven shaft, co-axial with said auxiliary shaft; a plurality of change-speed gearing combinations between said driving and auxiliary shafts; a change-speed gearing combination between said third and auxiliary shafts; one of the gears on said auxiliary shaft being adapted to mesh with a gear on said driving and third shafts and another gear on said auxiliary shaft being adapted only to mesh with a gear on said third shaft; a change-speed gearing combination between said third and driven shafts; and means for connecting and disconnecting said auxiliary and driven shafts.

EDWARD P. BULLARD, III.
EDWARD N. COWELL.
FRANK H. MUSSLER.